(12) United States Patent
Goldbach et al.

(10) Patent No.: US 11,111,612 B2
(45) Date of Patent: Sep. 7, 2021

(54) HIGH MELT FLOW FLUOROPOLYMER COMPOSITION

(71) Applicant: Arkema Inc., King of Prussia, PA (US)

(72) Inventors: James T. Goldbach, Paoli, PA (US); James J. Henry, Downingtown, PA (US); Sean M. Stabler, Pottstown, PA (US); Jérôme Chauveau, Mesnil en Ouche (FR)

(73) Assignee: Arkema Inc., King of Prussia, PA (US)

( * ) Notice: Subject to any disclaimer, the term of this patent is extended or adjusted under 35 U.S.C. 154(b) by 491 days.

(21) Appl. No.: 15/312,363

(22) PCT Filed: May 19, 2015

(86) PCT No.: PCT/US2015/031469
§ 371 (c)(1),
(2) Date: Nov. 18, 2016

(87) PCT Pub. No.: WO2015/179333
PCT Pub. Date: Nov. 26, 2015

(65) Prior Publication Data
US 2017/0088989 A1    Mar. 30, 2017

Related U.S. Application Data

(60) Provisional application No. 62/000,160, filed on May 19, 2014.

(51) Int. Cl.
| | |
|---|---|
| *D04H 1/56* | (2006.01) |
| *D04H 1/4318* | (2012.01) |
| *C08F 214/22* | (2006.01) |
| *C08F 114/22* | (2006.01) |
| *C08F 14/22* | (2006.01) |

(52) U.S. Cl.
CPC ............... *D04H 1/56* (2013.01); *C08F 14/22* (2013.01); *C08F 114/22* (2013.01); *C08F 214/222* (2013.01); *D04H 1/4318* (2013.01)

(58) Field of Classification Search
None
See application file for complete search history.

(56) References Cited

U.S. PATENT DOCUMENTS

| 5,093,427 A | 3/1992 | Barber |
| 5,177,150 A | 1/1993 | Polek |
| 5,229,460 A * | 7/1993 | Yousuf ...................... C08J 3/12 |
| | | 525/198 |
| 5,283,302 A * | 2/1994 | Wakamori ............ C08F 214/22 |
| | | 525/276 |
| 5,324,785 A | 6/1994 | Noda et al. |
| 5,637,669 A | 6/1997 | Hefner, Jr. et al. |
| 5,688,600 A | 11/1997 | Bailey, Jr. |
| 6,036,735 A | 3/2000 | Carter et al. |
| 6,187,885 B1 | 2/2001 | Barber |
| 6,362,271 B1 | 3/2002 | Lin et al. |
| 6,551,708 B2 * | 4/2003 | Tsuda ................... C09D 127/16 |
| | | 428/402 |
| 7,015,159 B2 | 3/2006 | Auza et al. |
| 7,501,085 B2 | 3/2009 | Bodaghi et al. |
| 7,927,690 B2 | 4/2011 | Taguchi et al. |
| 7,989,369 B2 | 8/2011 | Bond et al. |
| 8,394,549 B2 | 3/2013 | Terada et al. |
| 8,395,016 B2 | 3/2013 | Isele et al. |
| 8,691,344 B2 | 4/2014 | Harvey et al. |
| 2005/0118917 A1 | 6/2005 | Khan et al. |
| 2006/0222811 A1 | 10/2006 | Greason et al. |
| 2010/0286329 A1 | 11/2010 | Fukushi et al. |
| 2010/0298487 A1 | 11/2010 | Bonnet et al. |
| 2011/0184388 A1 | 7/2011 | Park et al. |
| 2013/0284245 A1* | 10/2013 | Kim ......................... C08J 7/045 |
| | | 136/252 |
| 2013/0345381 A1 | 12/2013 | Amin-Sanayei et al. |
| 2014/0005325 A1* | 1/2014 | Amin-Sanayei ........ C08L 27/16 |
| | | 524/546 |
| 2017/0368731 A1 | 12/2017 | Devisme et al. |

FOREIGN PATENT DOCUMENTS

| JP | 2002266219 A | 9/2002 | |
| JP | 2006036861 A | 2/2006 | |
| WO | WO-2012112840 A1 * | 8/2012 | ............ B01D 71/32 |

OTHER PUBLICATIONS

Gilbert, et al., "Dispersity in Polymer Science", Pure and Applied Chemistry, 2009, vol. 81, No. 2, p. 353.
Ellison, Christopher, et al., "Melt Blown nanofibers: Fiber diameter distributions and onset of fiber breakup", Polymer, 48 (2007) pp. 3306-3316.
Arkema Press Release, "New High Fluidity Kynar 705 for PVDF Ultra Resistant Mono and Multifilaments Fibers", Aug. 20, 2012, 1 page, XP55210254 (Kynar 705 Lenzing).

* cited by examiner

*Primary Examiner* — Nicole M. Buie-Hatcher
(74) *Attorney, Agent, or Firm* — Joanne Rossi

(57) ABSTRACT

The invention relates to very high melt flow fluoropolymer compositions, having low melt viscosities. The fluoropolymers have low molecular weights of from 5 kDa to 200 kDa and melt viscosities of less than 2 kilopoise (kP) at 232° C. and 100 $s^{-1}$. One use for the high melt flow fluoropolymers is in the formation of very small diameters fibers, useful for melt-blown non-woven materials. Fiber diameters of less than 9 microns, and preferably 500 to 2000 nm can be produced.

17 Claims, No Drawings

HIGH MELT FLOW FLUOROPOLYMER COMPOSITION

This application claims benefit, under U.S.C. § 119 or § 365 of PCT Application Number PCT/US2015/031469, filed May 19, 2015; and U.S. Provisional Application No. 62/000,160, filed May 19, 2014; said applications incorporated herein by reference.

FIELD OF THE INVENTION

The invention relates to very high melt flow fluoropolymer compositions, having low melt viscosities. The fluoropolymers have low molecular weights of from 5 kDa to 200 kDa and melt viscosities of less than 2 kilopoise (kP) at 232° C. and 100 $s^{-1}$. One use for the high melt flow fluoropolymers is in the formation of very small diameters fibers, useful for melt-blown non-woven materials. Fiber diameters of less than 9 microns, and preferably 500 to 2000 nm can be produced.

BACKGROUND OF THE INVENTION

The field of nonwovens consists of a myriad of different materials that are neither woven nor knitted, but are composed of long fibers bonded together by physical entanglement, or by chemical, mechanical, thermal or solvent treatment. Nonwovens are classified by the methods used to generate the fibers and to bond them into a tough fiber web.

Non-wovens find application in many areas such as dry and wet filtration, disposable gowns, wipes, diapers and absorbents, sound attenuation, and layered textiles. The choice of a nonwoven for any given application is governed by the physical, chemical, performance and cost requirements for the product in question. Oftentimes, these requirements are inter-dependent with trade-offs in one area for an increase or decrease in another.

Nonwoven meltblown fibers are generally formed by melt extruding a low viscosity (high melt flow rate) thermoplastic through an opening or array of openings in a die, followed by spinning, stretching, calendaring, or blowing of the extrudate with concomitant application to a moving take-up device, generating a physically-entangled fiber web. The fiber web can then be further converted by post-processing, such as by exposing to heat, ultrasonic energy, solvent, coating with another material and physical compression to increase its mechanical toughness.

The melt flow properties of the resin dictate the type of processing possible, and the nature of the fibers produced. The melt flow properties of the resin affect such final properties as fiber diameter, shape, density, and web thickness. The fiber properties then translate into material properties, such as filtration retention performance, (air or liquid) flow-through rate, and mechanical toughness. Typical fiber diameters obtained by a melt-blown process can be in the range of 2 to 8 microns (U.S. Pat. No. 7,989,369).

Nanofiber webs, having fibers with a diameter on a nano-scale (<1 micron), are desired due to their high surface are, low pore size, and other characteristics. Producing these materials requires resins having melt flows roughly an order of magnitude higher than those used for micro-fibers. Available resins having this ultra-high melt flow are very limited, and include polypropylene and polybutylene terephthalate. For many applications where chemical, thermal and oxidative resistance is critical, these material classes are insufficient.

Fluoropolymers, and polyvinylidene fluoride in particular, possess many favorable physical properties that make them the material of choice in many applications. Polyvinylidene fluoride (PVDF) has a marked toughness and high elasticity, and has a high chemical, weathering, permeation and flammability resistance.

KYNAR® 705 fluoropolymer resin from Arkema Inc. has a melt flow of about 3.0 kP by capillary rheometry at 260° C. and 100 $s^{-1}$, and can produce fibers with diameters in the range of 5 to 25 microns.

There is a desire for a high melt flow fluoropolymer that can be used to produce nanofibers by a melt-blowing process. Surprisingly it has been found that low molecular weight fluoropolymers can be produced having an ultra-high meltflow, and these ultra-high melt flow fluoropolymers are useful for producing fluoropolymer nanofibers.

SUMMARY OF THE INVENTION

The invention relates to a fluoropolymer comprising at least 60 weight percent of one or more fluoromonomers, wherein said fluoropolymer has a melt viscosity of 0.01 to below 2.0 kP, at 100 $s^{-1}$ and 230° C., as measured by parallel plate rheology, and has a weight-average molecular weight of from 5,000 to 200,000 Dalton as measured by GPC.

The invention further relates to micro- and nanofibers formed from the low melt viscosity fluoropolymer, and to non-woven materials formed from the nanofibers by a melt-blowing process. The invention further relates to the use of these materials as neat or majority component of a blend in injection molding processes, where the process requires higher melt flow materials than those commonly used in the art which would have measured melt viscosities higher than that described here. The use of the materials of the present invention in such a process facilitates the production of intricate final parts, unattainable using other fluoropolymers of higher melt viscosity.

DETAILED DESCRIPTION OF THE INVENTION

The invention relates to a very low melt flow fluoropolymers that are useful in forming very small diameter fibers for melt-blown non-woven materials, and in injection molding processes.

All references cited herein are incorporated by reference. Unless otherwise stated, all molecular weights are weight average molecular weights as determined by Gel Permeation Chromatography in DMF/0.003M LiBr solvent at room temperature, vs. poly(methyl methacrylate) narrow standard calibration, and all percentages are percentage by weight. Melt viscosities are determined by capillary rheometry or parallel plate rheometry at 230 C, and values reported are those taken at a shear rate of 100 $s^{-1}$.

The term "copolymer" as used herein indicates a polymer composed of two or more different monomer units, including two comonomers, three comonomers (terpolymers), and polymers having 4 or more different monomers. The copolymers may be random or block, may have a heterogeneous or homogeneous distribution of monomers, and may be synthesized by a batch, semi-batch or continuous process using neat monomer, solvent, aqueous suspension or aqueous emulsion as commonly known in the art.

Fluoropolymers

The high melt flow fluoropolymers of the invention are homopolymers or copolymers containing fluorinated monomers. The presence of fluorine on the polymer is known to impart enhanced chemical resistance, reduced coefficient of friction, high thermal stability, and enhancement of the material's triboelectricity. The term "fluoromonomer" or the expression "fluorinated monomer" means a polymerizable alkene which contains in its structure at least one fluorine atom, fluoroalkyl group, or fluoroalkoxy group whereby those groups are attached to the double bond of the alkene which undergoes polymerization. The term "fluoropolymer" means a polymer formed by the polymerization of at least one fluoromonomer, and it is inclusive of homopolymers and copolymers, and both thermoplastic and thermoset polymers. Thermoplastic polymers are capable of being formed into useful pieces by flowing upon the application of heat, such as is done in molding and extrusion processes, including blown fibers. While thermoset fluoropolymers cannot themselves be processed by melt-blowing, the precursors to, and oligomers of, the thermoset polymer could be melt-blown, assuming the viscosity is adjusted to allow for a viscosity capable of being melt-blown. Thickeners could be used to increase the viscosity of the pre-polymers, if needed, as known in the art. Conversely, plasticizers or diluents could be added to decrease the viscosity of the pre-polymers. Once the pre-polymers are melt-blown together, they can then be cured (functionality reacted and cross-linked) using an appropriate energy source, such as heat, UV radiation, e-beam, or gamma radiation. One non-limiting example of a thermoset fluoropolymer would be the use of vinylidene fluoride and hexafluoropropene monomers with a fluoromonomer having bromide functionality. The brominated fluoropolymer could be melt-blown, followed by radical cross-linking through the bromine functionality using a pre-added thermal radical source, or one that generates radicals upon application of light, UV, electron-beam or gamma radiation.

The fluoropolymers may be synthesized by known means, including but not limited to bulk, solution, suspension, emulsion and inverse emulsion processes. Free-radical polymerization, as known in the art, is generally used for the polymerization of the fluoromonomers.

Fluoromonomers useful in the practice of the invention include, for example, vinylidene fluoride (VIA), tetrafluoroethylene (TFE), trifluoroethylene (TrFE), chlorotrifluoroethylene (CTFE), dichlorodifluoroethylene, hexafluoropropene vinyl fluoride (VF), hexafluoroisobutylene (HFIB), perfluombutylethylene (PFBE), 1,2,3,3,3-pentafluoropropene, 3,3,3-trifluoro-1-propene, 2-trifluoromethyl-3,3,3-trifluoropropene, 2,3,3,3-tetrafluoropropene, 1-chloro-3,3,3-trifluoropropene, fluorinated vinyl ethers including perfluoromethyl ether (PMVE), perfluoroethylvinyl ether (PEVE), perfluoropropyl vinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof. Fluoropolymers useful in the practice of the present invention include the products of polymerization of the fluoromonomers listed above, for example, the homopolymer made by polymerizing vinylidene fluoride (VDF) by itself or the copolymer of VDF and HFP.

In one embodiment of the invention, it is preferred that all monomer units be fluoromonomers, however, copolymers of fluoromonomers with non-fluoromonomers are also contemplated by the invention. In the case of a copolymer containing non-fluoromonomers, at least 60 percent by weight of the monomer units are fluoromonomers, preferably at least 70 weight percent, more preferably at least 80 weight percent, and most preferably at least 90 weight percent are fluoromonomers. Useful comonomers include, but are not limited to, ethylene, propylene, styrenics, acrylates, methacrylates, (meth)acrylic acid and salts therefrom, alpha-olefins of C4 to C16, butadiene, isoprene, vinyl esters, vinyl ethers, non-fluorine-containing halogenated ethylenes, vinyl pyridines, and N-vinyl linear and cyclic amides.

In one embodiment, the fluoropolymer does not contain ethylene monomer units.

In a preferred embodiment, the fluoropolymer contains a majority by weight of vinylidene fluoride (VDF) monomer units, preferably at least 70 weight percent VDF monomer units, and more preferably at least 80 weight percent of VDF monomer units.

Other useful fluoropolymers include, but are not limited to polyvinyl fluoride (PVF), polychlorotrifluoroethylene (CITE), polytetrafluoroethylene (PTFE), fluorinated ethylene vinyl ether (FEVE), (per)fluorinated ethylene-propylene (FEP)

Fluoropolymers and copolymers may be obtained using known methods of solution, emulsion, and suspension polymerization. In a preferred embodiment, the fluoropolymer is synthesized using emulsion polymerization whereby the emulsifying agent ('surfactant') is either perfluorinated, fluorinated, or non-fluorinated. In one embodiment, a fluorocopolymer is formed using a fluorosurfactant-free emulsion process. Examples of non-fluorinated (fluorosurfactant-free) surfactants are described in U.S. Pat. Nos. 8,080,621, 8,124,699, 8,158,734, and 8,338,518 all herein incorporated by reference. In the case of emulsion polymerization utilizing a fluorinated or perfluorinated surfactant, some specific, but not limiting examples are the salts of the acids described in U.S. Pat. No. 2,559,752 of the formula $X(CF_2)_n$-COOM, wherein X is hydrogen or fluorine, M is an alkali metal, ammonium, substituted ammonium (e.g., alkylamine of 1 to 4 carbon atoms), or quaternary ammonium ion, and n is an integer from 6 to 20; sulfuric acid esters of polyfluoroalkanols of the formula $X(CF—)_2$-$CH_2$—$OSO_3$-M, where X and M are as above; and salts of the acids of the formula $CF_3$—$(CF_2)_n$—$(CX_2)_m$-SO3M, where X and M are as above, n is an integer from 3 to 7, and m is an integer from 0 to 2, such as in potassium perfluorooctyl sulfonate. The use of a microemulsion of perfluorinated polyether carboxylate in combination with neutral perfluoropolyetherin vinylidene fluoride polymerization can be found in EP0816397A1. The surfactant charge is from 0.05% to 2% by weight on the total monomer weight used, and most preferably the surfactant charge is from 0.1% to 0.2% by weight.

The fluoropolymers of the invention are low molecular weight, having a melt viscosity of 0.01 to 2.0 kP, preferably from 0.03 to 1.0 kP, preferably from 0.05 to 1.0 kP, and more preferably from 0.1 to 0.8 kP at 100 s$^{-1}$ and 230° C., as measured by parallel plate rheology. Alternately, capillary rheometry under the same conditions, could be used according to ASTM D3825. The two methods were found to produce similar results. The weight average molecular weight of the fluoropolymer is from 15,000 to 200,000 Dalton, preferably from 15,000 to 100,000 Dalton, as measured by GPC in DMF/0.003M LiBr at room temperature, vs. poly(methyl methacrylate) narrow standard calibration.

The fluoropolymers of the invention are not oligomeric, as defined by having a weight-average molecular weight less-than 10,000 Da as measured by GPC using the methodology mentioned previously. Methods are known in the art, whereby fluoromonomers can be oligomerized as outlined in U.S. Pat. Nos. 2,856,440, 2,907,795, and G. Mladenov, et. al., Journal of Polymer Science: Part A: Polymer Chemistry, Vol. 44, 1470-1485 (2006). These methods are limited to producing only very low molecular-weight oligomeric materials, often using very high-cost starting materials such as diiodo-perfluoroalkanes and solution-based processes, and reaction conditions and times which are not amenable to large commercial production.

Low molecular weight fluoropolymers of the invention can be obtained by using one or more chain transfer agent at high levels as compared to reaction processes used to generate high molecular weight engineering thermoplastics. Useful chain transfer agents include, but are not limited to C2 to C18 hydrocarbons like ethane, propane, n-butane, isobutane, pentane, isopentane, 2,2-dimethylpropane, and longer alkanes is isomers thereof. Also useful are alkyl and aryl esters such as pentaerythritol tetraacetate, methyl acetate, ethyl acetate, propyl acetate, iso-propyl acetate, ethyl propionate, ethyl isobutyrate, ethyl tert-butyrate, diethyl maleate, ethyl glycolate, benzyl acetate, C1-C16 alkyl benzoates, and C3-C18 cycloalkyl alkyl esters such as cyclohexyl acetate. Alcohols, carbonates, ketones, halocarbons, hydrohalocarbons, such as chlorocarbons, hydrochlorocarbons, chlorofluorocarbons, hydrochlorofluorocarbons, chlorosilanes and alkyl and aryl sulfonyl chlorides are also contemplated useful chain transfer agents. In one preferred embodiment a hydrocarbon or ester are used. The amount of chain-transfer agent can be from 0.01 to 30.0% of the total monomer incorporated into the reaction, preferably from 0.1 to 20.0% and most preferably from 0.2 to 10.0%. Chain-transfer agents may be added all at once at the beginning of the reaction, in portions throughout the reaction, or continuously as the reaction progresses or in combinations of these methods. The amount of chain-transfer agent and mode of addition which is used depends on the activity of the agent and the desired molecular weight characteristics of the product.

It is also envisioned that the polymerization could occur in a solvent system where the solvent acts as the chain transfer agent, or a solvent system with a functionally-inert solvent and an additional chain-transfer-active compound. Performing the reaction at higher temperatures would also be expected to produce lower molecular weight polymer, as would increasing the level of initiator.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65 C to 105 C temperature range. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate or ascorbic acid. Among the organic peroxides which can be used for the polymerization are the classes of dialkyl peroxides, peroxyesters, and peroxydicarbonates. Exemplary of dialkyl peroxides is di-t-butyl peroxide, of peroxyesters are t-butyl peroxypivalate and t-amyl peroxypivalate, and of peroxydicarbonates are di(n-propyl) peroxydicarbonate, diisopropyl peroxydicarbonate, di(secbutyl)peroxydicarbonate, and di(2-ethylhexyl) peroxydicarbonate. The use of diisopropyl peroxydicarbonate for vinylidene fluoride polymerization and copolymerization with other fluorinated monomers is taught in U.S. Pat. No. 3,475,396, and its use in making vinylidene fluoride/hexafluoropropylene copolymers is further illustrated in U.S. Pat. No. 4,360,652. The use of di(n-propyl) peroxydicarbonate in vinylidene fluoride polymerizations is described in the Published Unexamined Application (Kokai) JP 58065711. The quantity of an initiator required for a polymerization is related to its activity and the temperature used for the polymerization. The total amount of initiator used is generally between 0.05% to 2.5% by weight based on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

In one embodiment a branched or star polymer is produced, using a long-chain comonomer, multi-functional (co)monomer, multi-functional chain-transfer agent, multi-functional initiator or by adjusting process conditions to increase the rate of chain-transfer to polymer, thus providing active sites for branches to grow from the polymer backbone. Branching could induce melt shear thinning of the polymer, increasing the melt flow, particularly under high-shear conditions such as those experience in injection molding or melt-blowing of micro- and nanofibers.

In another embodiment, the low molecular weight fluoropolymer could contain reactive functional groups, either by using a functional monomer, or by a post-treatment. Once the functional polymer is processed into a useful article, it could then be reacted or cross-linked for increased integrity. Cross-linking is known in the art to generally increase the tensile and flexural moduli, and reduce solubility and permeability of the cross-linked material, all of which could be advantageous physical property enhancements depending on the material's final application.

The fluoropolymer composition of the invention, capable of being melt-processed, contains one or more fluoropolymers, and optionally one or more additives including but not limited to plasticizers; inorganic fillers such as talc, calcium carbonate, inorganic fibers, including glass fibers, carbon fibers and carbon nanotubes; pigments; dyes; antioxidants; impact modifiers; surfactants; dispersing aids; compatible or incompatible non-fluoropolymers; and solvents as known in the art. Additives are generally used in the fluoropolymer composition at levels up to 40 weight percent based on the fluoropolymer, more preferably at a level of 0.01 to 30 weight percent, and more preferably from 0.1 to 20 weight percent. The additives can be introduced to the fluoropolymer composition by known means prior to melt processing, or during the melt processing operation.

Melt Processing

The process of meltblowing polymer resins has been known for many years and is widely used to generate nonwoven webs of fibers with fiber diameters <5 μm. This process was historically carried out by in-situ partial degradation (vis-breaking) of low melt-flow, high viscosity polypropylene resins to achieve low viscosity, high-flow materials needed to generate such fine fibers, as described in U.S. Pat. No. 3,849,241. Recently, advances in synthetic methods have allowed the direct synthesis of polypropylene resins with the needed flow properties without the use of visbreaking methodologies. Also, literature examples have shown that other polymer resins that meet these high melt-flow rheological properties in a practical range of processing temperatures can be effectively meltblown, as described in Ellison, C. J. et. al., Polymer, 48, 2007, 3306-3316.

The fluoropolymers of the invention have similar rheological behavior to polypropylene resins. The high melt flow fluoropolymers of the invention may be used on equipment currently being used for producing polypropylene nanofibers, with few, if any changes required.

The basic process of melt blowing fibers to form nonwoven mats is described in U.S. Pat. No. 3,849,241, and involves the steps of a) melt extruding a low viscosity (high melt flow rate) thermoplastic through an array of holes in a meltblown die, followed by spinning, stretching, calendaring, or blowing of the extrudate with concomitant application to a moving take-up, generating a physically-entangled fiber web. The fiber web can then be further bonded by post-processing, such as by exposing to heat, ultrasonic energy, solvent and physical compression to increase its mechanical toughness.

Melt-blown fibers made with the fluoropolymers and fluoropolymer composition of the invention have number average diameters of from 10 to 9,000 nanometers (nm), preferably 50 to 5,000 nm, more preferably from 500 to 2000 nm Multi-component fibers, defined as individual fibers containing one or more immiscible materials are also contemplated by the invention, and the high melt flow fluoropolymers of the invention could be combined with one or more other polymers having similar melt-flow characteristics, to form multi-component fibers in the nano-scale. It is also contemplated having a blend of two or more different polymer material fibers. The multi-component fibers are often referred to as "conjugate fibers" or "fibrillated" fibers. They contain two or more components that are often incompatible. Multi-component fibers are a means of combining the properties of different thermoplastics into a single fiber. The components of the fiber make up many separate continuous microfibrils running the length of the fiber. The individual fibrils can take many shapes, including wedges, pie-shapes, side-by-side, sheath-core, core-sheath, bi-lobal or multi-lobal. In a cross section of the fiber, each microfibril appears as a non-continuous phase. In one arrangement, often described as "islands in the sea", many microfibrils, often from 10 to 500, constitute non-continuous individual round or ovoid fibrils in a continuous phase of a second polymer. Useful compatible polymers for use with the fluoropolymer of the invention include poly(methyl methacrylate) (PMMA), poly(ethyl methacrylate) (PEMA), poly (methyl acrylate) (PMA), poly(ethyl acrylate) (PEA), poly (vinyl acetate) (PVAc), poly(vinyl methyl ketone) (PVMK), thermoplastic urethanes (TPU) thermoplastic starch, and other (meth)acrylic polymers. Useful incompatible polymer include, but are not limited to polyolefins such as polyethylene and polypropylene, polyamides (PA) and copolyamides (such as PA 11, PA 12, PA 6, PA 6,6, PA 6,10), polyesters such as polyethylene terphthalate, poly(butylene terephthalate, poly(lactic acid) (PLA), poly(ether-ether-ketone) (PEEK), poly(ether sulfones) (PES), and other fluoropolymers as described previously. The multi-component fibers are typically produced by simultaneously and continuously extruding a plurality of molten polymers through spinning orifices of a spinneret to form multiple fibril strands.

Additionally, the fluoropolymer of the invention can make up between 1 and 99 weight percent of the polymers in an article comprised of a blend of fibers, each comprised of a different base material or multi-component fibers as described previously. The fibers of varying base material can consist of glass fibers, carbon fibers, cellulose, polyaramid, polyimides, polyethers polycarbonates, polyether imide, polyamides, or polystyrenics.

The fluoropolymer nanofibers of the invention, and the non-woven materials formed from those fibers have several advantages over polyolefin and polyester fibers, making them desirable is several applications. The properties and uses of the fibers and non-woven materials listed below are representative of properties and uses for these fibers. One of ordinary skill in the art, based on the teaching of the present application, can imagine other useful properties and applications for this novel technology.

1. Chemical resistance. Fluoropolymers, by the nature of the fluorine chemistry, are known to be highly resistant to many chemical agents, including acids, bases, oxidizing agents, solvents Such as hydrocarbons and hydrocarbon mixtures, alcohols, alkyl and aromatic ethers, aqueous salt solutions. As such, fibers and non-wovens made of the fibers are useful in filters and membranes for toxic and corrosive materials (including filters/membranes that are cleaned by ozone or chlorine); as garments, coverings and wipes that may contact with hazardous materials; elevated temperatures or a combination thereof.
2. Fire retardancy. Fluoropolymers are far more fire retardant than polyolefins or polyesters generally used in forming non-woven materials. Nanofiber materials of fluoropolymers could provide added protection from flames in areas where nonwovens are used.
3. Higher melt temperatures: Fluoropolymer nanofiber nonwovens of the invention generally have melting points above those of the more common polyolefins and polyesters, allowing for use of the materials in higher temperature applications
4. Electrical charging. Nonwovens can be electrically charged—allowing them to better attract dirt and other particles. Since most fluoropolymers are low on the triboelectric series, they would hold a higher electrical charge, and would therefore act as super-attractants for dirt and other particles, making them extremely useful in cleaning and dusting applications, as well as in air filtration to trap and remove particulates.

The nano-sized fluoropolymers of the invention offer advantages over micro-fluoropolymer fibers, as they have a higher surface area, making them more useful for membranes, and filters.

Applications of and further processing of the melt-blown materials of the current invention are also contemplated. These include, but are not limited to thermal bonding by calendaring, application of hot-melt adhesive, point-bonding, or ultrasonic welding as known in the art. Further, chemical treatment may be performed to enhance the final properties of the material including solvent treatment to swell fibers, induce tackiness and enhance bonding to substrates or other materials. Further, mechanical treatments may be applied including needle-punching, entanglement using air, water or other medium, stretching, pleating, compression, or electrical charging. It is further envisioned that surface-treatments may be applied, including chemical etching, plasma corona treatment, thermal, UV or other electromagnetic radiation, to impact chemical functionality to the exterior portions of the fibers for the chemical attachment of other functional compounds or to improve adhesion to other materials. The untreated, or treated material could then be mechanically cut or ground into smaller pieces useful as staple fiber as known in the art. It is further envisioned that the fibrous materials produced using the compositions of the present invention could be attached to substrates serving as mechanical supports or other function, depending on the specific application. These substrates can be, but are not limited to: cellulosics/paper, polyolefin films or webs of fibers, polyester films or webs of fibers, other fluorinated films or webs of fibers, films or webs of thermoset materials, and glass, ceramic or metal fiber mats or webs and mechanical blends of any of these examples generated by co-spinning or entanglement by methods known in the art. Finishing and application of the final materials as described above could involve folding/pleating, stretching, compressing, electrical charging as well as introduction of the material into a housing made from PVDF or copolymers of VDF and other fluoromonomers as described herein, whereby said housing is sealed using caps made from PVDF or copolymers of VDF and other fluoromonomers as described herein. It is further envisioned that the material webs produced using the polymers of the current invention could be colored by the incorporation of pigments and dyes during extrusion using masterbatches, or as a post-production step as known in the art.

EXAMPLES

Example 1

A 2 L internal-volume high-pressure autoclave is charged with 1000 mL of deionized water, and 0.6 g of polyalkylene oxide surfactant. The autoclave purged with nitrogen with rapid agitation for 20 min. The autoclave vent is closed, 5.0 g of hydrocarbon chain transfer agent is added and the heat is applied to bring the contents to 83° C. Vinylidene fluoride (VDF, approximately 140 g) is then added to bring the pressure to 650 psi. Agitation is continued and a 1 wt.-% (each) solution of potassium persulfate and sodium acetate (total of 2 wt.-% solids) is added at 30 mL/min until the pressure begins to decrease, then the addition rate is decreased to 0.5 mL/min VDF is added continuously to maintain a pressure of 650 psi until 400.0 g has been added. VDF and initiator feed is stopped and the reaction is held at 83° C. until the pressure drops below 300 psi at which point the reactor is vented and cooled to room temperature. 1.3 L of white, fluid latex is obtained. The latex is dried at 110° C. for 12 h in a forced-air oven to obtain dry, solid crumbs. Latex characterization, particle size: 276 nm, % solids: 30.2%; polymer characterization: melt flow (232° C., 100s−1)=0.4 kP, molecular weight (GPC in DMF/0.02 MLiBr, vs. poly(methyl methacrylate) 10-point narrow-standard calibration): Mw=105.7 kDa, Mn=52.7 KDa; melting point (DSC, $2^{nd}$ heat, 170.7° C.

Examples 2-6

VDF Homopolymer

An 80 gal. internal-volume high-pressure autoclave reactor is charged with 400 lb of deionized water, and 720 g of fluorosurfactant (30 wt.-% aqueous solution). The autoclave is purged of oxygen by evacuation and backfilling with nitrogen. The autoclave vent is closed, ester chain-transfer agent is added and heat is applied to bring the contents to 83° C. Vinylidene fluoride is then added to bring the pressure to 650 psi. Agitation is continued and 8.0 lb of a 1.65 wt.-% (each) solution of potassium persulfate and sodium acetate (total of 3.3 wt.-% solids) is added rapidly. Following a short induction period, initiator solution is continuously fed at a rate of 0.5 to 6.0 lb/hr to maintain adequate reaction rate. VDF is added continuously to maintain a pressure of 650 psi until 212.0 lb has been added. VDF and initiator feeds are stopped and the reaction is held at 83° C. until the pressure drops below 300 psi at which point the reactor is vented and cooled to room temperature. ~600 lb of white, fluid latex is obtained. The latex is diluted to 20 wt.-% and spray-dried, generating a white, fluffy powder. Latex characterization, particle size: ~300 nm, % solids: ~30.0%.

Examples 7 & 8

VDF/HFP Copolymer

An 80 gal. internal-volume high-pressure autoclave reactor is charged with 345 lb of deionized water, and 66 g of polyalkylene oxide surfactant. The autoclave is purged of oxygen by evacuation and backfilling with nitrogen. The autoclave vent is closed, alkyl ester chain transfer agent is added and heat is applied to bring the contents to 83° C. 18.3 lb of hexafluoropropylene is added rapidly and vinylidene fluoride is then added to bring the pressure to 650 psi. Agitation is continued, and 6.5 lb of a 1.0 wt.-% (each) solution of potassium persulfate and sodium acetate (total of 2.0 wt.-% solids) is added rapidly. Following a short induction period, initiator solution is continuously fed at a rate of 0.5 to 6.0 lb/hr to maintain adequate productivity. VDF and HFP are added continuously to maintain a pressure of 650 psi until 210.0 (165 lb VDF/45 lb HFP) lb has been added. VDF, HFP and initiator feeds are stopped and the reaction is held at 83° C. until the pressure drops below 300 psi at which point the reactor is vented and cooled to room temperature. ~550 lb of white, fluid latex is obtained (solids content ~33%). The latex is diluted to 20 wt.-% and spray-dried to a white powder.

Example 9

Meltblown Fabric

VDF homopolymer having a viscosity of 0.11 kpoise measured on a capillary viscometer (232° C., 100s−1) was processed on a melt blown extrusion line to produce melt blown fabrics having varied basis weights and fiber diameters. The extrusion line consisted of a 1.5 inch Brabender single screw extruder outfitted with a standard metering screw. An Exxon style melt blown die having 120 holes having a diameter of 0.018 inches, a setback of 0.08 inches and an air gap of 0.60 inches was outfitted at the end of the extruder. Meltblown fibers were extruded at a targeted output of 0.45 grams per hole per minute (ghm) and collected on a moving belt. Process conditions were adjusted to produce samples of varied basis weight measured in grams per square meter (gsm) and fiber diameter measured in micrometers (μm) as shown in the following tables.

| Fabric Sample | Extruder Temperature | | | | Die Temperature | | Screw Pressure PSI |
|---|---|---|---|---|---|---|---|
| | Zone 1 ° C. | Zone 2 ° C. | Zone 3 ° C. | Adapter ° C. | Zone 1 ° C. | Zone 2 ° C. | |
| 1 | 195 | 232 | 253 | 245 | 245 | 241 | 130 |
| 2 | 189 | 231 | 238 | 244 | 248 | 241 | 126 |
| 3 | 186 | 227 | 239 | 246 | 243 | 241 | 169 |
| 4 | 179 | 222 | 241 | 245 | 246 | 244 | 115 |

| Fabric Sample | Screw Speed rpm | Air Temp. °F. | Air Pressure PSI | Collector Speed m/min | Die Collector Distance cm | Basis Weight g/M2 | Average Diameter μm |
|---|---|---|---|---|---|---|---|
| 1 | 20 | 525 | 9 | 3.93 | 15 | 103 | 2.38 |
| 2 | 20 | 525 | 9 | 3.93 | 25 | 137 | 4.15 |
| 3 | 20 | 550 | 9 | 2.63 | 25 | 155 | 2.29 |
| 4 | 10 | 550 | 5 | 7.83 | 15 | 29 | 3.04 |

Example 10

Meltblown Fabric

VDF homopolymer having a viscosity of 0.25 kpoise measured on a capillary viscometer (232° C., 100 s$^{-1}$) was processed on a melt blown extrusion line to produce melt blown fabrics having various basis weights. The extrusion line consisted of a 1.5 inch Brabender single screw extruder outfitted with a standard metering screw. An Exxon style melt blown die having 120 holes having a diameter of 0.018 inches, a setback of 0.08 inches and an air gap of 0.60 inches was outfitted at the end of the extruder. Meltblown fibers were extruded at a targeted output of 0.45 grams per hole per minute (ghm) and collected on a moving belt. Process conditions were adjusted to produce samples of varied basis weight measured in grams per square meter (gsm) and fiber diameter measured in micrometers (um) as shown in the following tables.

| Fabric Sample | Extruder Temperature | | | | Die Temperature | | Screw Pressure PSI |
|---|---|---|---|---|---|---|---|
| | Zone 1 °C. | Zone 2 °C. | Zone 3 °C. | Adapter °C. | Zone 1 °C. | Zone 2 °C. | |
| 5 | 193 | 229 | 253 | 245 | 240 | 244 | 143 |
| 6 | 202 | 227 | 260 | 245 | 240 | 245 | 196 |
| 7 | 184 | 225 | 247 | 242 | 240 | 245 | 212 |
| 8 | 194 | 236 | 259 | 243 | 244 | 246 | 163 |
| 9 | 179 | 234 | 249 | 244 | 245 | 244 | 199 |

| Fabric Sample | Screw Speed rpm | Air Temp. °F. | Air Pressure PSI | Collector Speed m/min | Die Collector Distance cm | Basis Weight | Average Diameter |
|---|---|---|---|---|---|---|---|
| 5 | 10 | 500 | 12 | 10.33 | 25 | 29 | 3.12 |
| 6 | 10 | 500 | 12 | 7.83 | 25 | 27 | 3.29 |
| 7 | 10 | 500 | 12 | 5.45 | 25 | 42 | 3.18 |
| 8 | 10 | 500 | 12 | 2.81 | 25 | 69 | 3.66 |
| 9 | 10 | 500 | 12 | 1.54 | 25 | 141 | 3.13 |

Example 11

Meltblown Fabric

VDF homopolymer having a viscosity of 0.62 kpoise measured on a capillary viscometer (232° C., 100 s$^{-1}$) was processed on a melt blown extrusion line to produce melt blown fabrics having various basis weights. The extrusion line consisted of a 1.5 inch Brabender single screw extruder outfitted with a standard metering screw. An Exxon style melt blown die having 120 holes having a diameter of 0.018 inches, a setback of 0.08 inches and an air gap of 0.60 inches was outfitted at the end of the extruder. Meltblown fibers were extruded at a targeted output of 0.45 grams per hole per minute (ghm) and collected on a moving belt. Process conditions were adjusted to produce samples of varied basis weight measured in grams per square meter (gsm) and fiber diameter measured in micrometers (μm) as shown in the following tables.

| Fabric Sample | Extruder Temperature | | | | Die Temperature | | Screw Pressure PSI |
|---|---|---|---|---|---|---|---|
| | Zone 1 °C. | Zone 2 °C. | Zone 3 °C. | Adapter °C. | Zone 1 °C. | Zone 2 °C. | |
| 10 | 191 | 231 | 243 | 244 | 248 | 247 | 329 |
| 11 | 195 | 226 | 242 | 242 | 244 | 245 | 290 |
| 12 | 201 | 232 | 253 | 245 | 245 | 246 | 350 |
| 13 | 194 | 232 | 251 | 245 | 244 | 247 | 300 |
| 14 | 180 | 229 | 243 | 243 | 244 | 246 | 307 |

| Fabric Sample | Screw Speed rpm | Air Temp. °F. | Air Pressure PSI | Collector Speed m/min | Die Collector Distance cm | Basis Weight gsm | Average Diameter μm |
|---|---|---|---|---|---|---|---|
| 10 | 10 | 525 | 17 | 1.54 | 25 | 130 | 4.1 |
| 11 | 10 | 550 | 17 | 3.56 | 25 | 86 | 4.38 |
| 12 | 10 | 550 | 17 | 5.45 | 25 | 55 | 4.55 |
| 13 | 10 | 550 | 17 | 7.38 | 25 | 40 | 4.59 |
| 14 | 10 | 550 | 17 | 10.33 | 25 | 29 | 4.14 |

Example 12

Meltblown Fabric

VDF homopolymer having a viscosity of 0.04 kpoise measured on a capillary viscometer (232° C., 100 s$^{-1}$) was processed on a melt blown extrusion line to produce melt blown fabrics having various basis weights. The extrusion line consisted of a 1.5 inch Brabender single screw extruder outfitted with a standard metering screw. An Exxon style melt blown die having 120 holes having a diameter of 0.010 inches, a setback of 0.08 inches and an air gap of 0.60 inches was outfitted at the end of the extruder. Meltblown fibers were extruded at a targeted output of 0.27 grams per hole per minute (ghm) and collected on a moving belt. Process conditions were adjusted to produce samples of varied basis weight measured in grams per square meter (gsm) and fiber diameter measured in micrometers (μm) as shown in the following tables.

| Fabric Sample | Extruder Temperature | | | | Die Temperature | | Screw Pressure PSI |
|---|---|---|---|---|---|---|---|
| | Zone 1 °C. | Zone 2 °C. | Zone 3 °C. | Adapter °C. | Zone 1 °C. | Zone 2 °C. | |
| 15 | 174 | 223 | 247 | 235 | 230 | 235 | 171 |
| 16 | 173 | 225 | 239 | 234 | 238 | 234 | 180 |
| 17 | 173 | 231 | 239 | 232 | 245 | 248 | 187 |
| 18 | 178 | 226 | 231 | 235 | 253 | 252 | 185 |
| 19 | 175 | 231 | 244 | 234 | 247 | 252 | 204 |
| 20 | 174 | 222 | 247 | 234 | 253 | 249 | 217 |

| Fabric Sample | Screw Speed rpm | Air Temp. °F. | Air Pressure PSI | Collector Speed m/min | DCD cm | Basis Weight gsm | Fiber Diameter μm |
|---|---|---|---|---|---|---|---|
| 15 | 7 | 500 | 4 | 4.69 | 20 | — | 2.4 |
| 16 | 7 | 500 | 5 | 4.69 | 20 | — | 2.2 |
| 17 | 7 | 500 | 4 | 4.69 | 15 | 44 | 1.2 |
| 18 | 7 | 500 | 4 | 4.69 | 25 | 50 | 1.4 |
| 19 | 7 | 500 | 4 | 8.18 | 25 | 30 | 1.7 |
| 20 | 7 | 500 | 4 | 12.11 | 25 | 21 | 1.7 |

Example 13

Meltblown Fabric

VDF homopolymer having a viscosity of 0.11 kpoise measured on a capillary viscometer (232° C., 100 s$^{-1}$) was processed on a melt blown extrusion line to produce melt blown fabrics having various basis weights. The extrusion line consisted of a 1.5 inch Brabender single screw extruder outfitted with a standard metering screw. An Exxon style melt blown die having 120 holes having a diameter of 0.010 inches, a setback of 0.08 inches and an air gap of 0.60 inches was outfitted at the end of the extruder. Meltblown fibers were extruded at a targeted output of 0.27 grams per hole per minute (ghm) and collected on a moving belt. Process conditions were adjusted to produce samples of varied basis weight measured in grams per square meter (gsm) and fiber diameter measured in micrometers (μm) as shown in the following tables.

| Fabric Sample | Extruder Temperature | | | | Die Temperature | | Screw Pressure PSI |
|---|---|---|---|---|---|---|---|
| | Zone 1 °C. | Zone 2 °C. | Zone 3 °C. | Adapter °C. | Zone 1 °C. | Zone 2 °C. | |
| 21 | 179 | 222 | 249 | 233 | 245 | 250 | 385 |
| 22 | 173 | 230 | 241 | 236 | 251 | 246 | 378 |
| 23 | 180 | 224 | 243 | 232 | 246 | 251 | 440 |
| 24 | 179 | 230 | 245 | 235 | 248 | 229 | 401 |
| 25 | 178 | 231 | 244 | 235 | 245 | 249 | 378 |
| 26 | 178 | 228 | 236 | 235 | 253 | 250 | 430 |

| Fabric Sample | Screw Speed rpm | Air Temp. °F. | Air Pressure PSI | Collector Speed m/min | DCD cm | Basis Weight gsm | Fiber Diameter μm |
|---|---|---|---|---|---|---|---|
| 21 | 7 | 500 | 10 | 3.93 | 25 | 55 | 1.7 |
| 22 | 7 | 500 | 9 | 3.93 | 15 | 53 | 1.6 |
| 23 | 7 | 500 | 9 | 7.19 | 15 | 32 | 1.6 |
| 24 | 7 | 500 | 9 | 7.19 | 25 | 30 | 1.4 |
| 25 | 7 | 500 | 9 | 9.42 | 25 | 18 | 1.6 |
| 26 | 7 | 500 | 9 | 9.42 | 15 | 13 | 1.3 |

Example 14

Meltblown Fabric

VDF-HFP co-homopolymer having a melting point of 127° C. as measured by DSC and a viscosity of 0.40 kpoise measured on a capillary viscometer (232° C., 100 s$^{-1}$) was processed on a melt blown extrusion line to produce melt blown fabrics having various basis weights. The extrusion line consisted of a 1.5 inch Brabender single screw extruder outfitted with a standard metering screw. An Exxon style melt blown die having 120 holes having a diameter of 0.010 inches, a setback of 0.08 inches and an air gap of 0.60 inches was outfitted at the end of the extruder. Meltblown fibers were extruded at a targeted output of 0.27 grams per hole per minute (ghm) and collected on a moving belt. Process conditions were adjusted to produce samples of varied basis weight measured in grams per square meter (gsm) and fiber diameter measure in micrometers (μm) as shown in the following tables.

| Fabric Sample | Extruder Temperature | | | | Die Temperature | | Screw Pressure PSI |
|---|---|---|---|---|---|---|---|
| | Zone 1 °C. | Zone 2 °C. | Zone 3 °C. | Adapter °C. | Zone 1 °C. | Zone 2 °C. | |
| 27 | 124 | 225 | 232 | 236 | 248 | 246 | 413 |

| Fabric Sample | Screw Speed rpm | Air Temp. °F. | Air Pressure PSI | Collector Speed m/min | DCD cm | Basis Weight gsm | Fiber Diameter μm |
|---|---|---|---|---|---|---|---|
| 27 | 7 | 500 | 9 | 9.42 | 25 | 16 | 4.4 |

Example 15

Comparative Example

Polypropylene (PP) from Exxon Mobil (Achieve 6936G1 Resin) having a melt flow rate of 1550 g/10 minutes (ASTM D 1238, 230° C., 2.16 Kg) was processed on a melt blown extrusion line to produce melt blown fabrics having various basis weights. The extrusion line consisted of a 1.5 inch Brabender single screw extruder outfitted with a standard metering screw. An Exxon style melt blown die having 120 holes having a diameter of 0.010 inches, a setback of 0.03 inches and an air gap of 0.60 inches was outfitted at the end of the extruder. Meltblown fibers were extruded at a targeted output of 0.27 grams per hole per minute (ghm) and collected on a moving belt. Process conditions were adjusted to produce samples of varied basis weight measured in grams per square meter (gsm) and fiber diameter measure in micrometers (μm) as shown in the following table.

| Fabric Sample | Extruder Temperature | | | | Die Temperature | | Screw Pressure PSI |
|---|---|---|---|---|---|---|---|
| | Zone 1 °C. | Zone 2 °C. | Zone 3 °C. | Adapter °C. | Zone 1 °C. | Zone 2 °C. | |
| 28 | 170 | 190 | 235 | 245 | 245 | 245 | 141 |
| 29 | 169 | 198 | 239 | 245 | 245 | 243 | 149 |
| 30 | 172 | 201 | 238 | 243 | 245 | 245 | 135 |

| Fabric Sample | Screw Speed rpm | Air Temp. °F. | Air Pressure PSI | Collector Speed m/min | DCD cm | Basis Weight gsm | Fiber Diameter μm |
|---|---|---|---|---|---|---|---|
| 28 | 6 | 500 | 4 | 115 | 25 | 20 | 0.96 |
| 29 | 6 | 500 | 4 | 50 | 25 | 50 | 0.91 |
| 30 | 6 | 500 | 4 | 25 | 25 | 85 | 1.35 |

Example 16

Fabric sample 14 was laminated under various pressure and temperature conditions using a hot roll laminator provided by ChemInstruments. Fabric samples were evaluated for changes in pore size as a function of lamination conditions with the following table.

| Fabric Sample | Lamination Conditions | | Mean Flow Pore Pressure psi | Mean Flow Pore Diameter μm | Bubble Point Pressure psi | Bubble Point diameter μm | Frazier @ 0.5" H2O ft3/min/ft2 |
|---|---|---|---|---|---|---|---|
| | Temp. °F. | Pressure psi | | | | | |
| 22 | No Laminations | | 0.18 | 49.19 | 0.13 | 68.40 | 15.38 |
| 22a | 290 | 30 | 0.46 | 19.58 | 0.19 | 48.24 | 13.03 |
| 22b | 290 | 50 | 0.36 | 25.02 | 0.24 | 38.05 | 9.87 |
| 22c | 305 | 50 | 0.60 | 15.00 | 0.26 | 35.32 | 6.88 |
| 22d | 310 | 50 | 0.96 | 9.35 | 0.41 | 22.24 | 7.67 |
| 22e | 315 | 50 | 1.96 | 4.59 | 0.55 | 16.52 | 5.49 |
| 22f | 320 | 50 | 1.90 | 4.74 | 1.04 | 8.65 | 6.02 |

Example 17

Meltblown Fabric

PVDF homopolymer having a viscosity of 0.11 kpoise as measured on a capillary viscometer (232° C., 100 s$^{-1}$) was processed on a melt blown extrusion line to produce melt blown fabrics having varied basis weights and fiber diameters. The following parameters and line configuration have been used: two single screw extruders outfitted with a standard metering screw, and die hole distribution of 35 holes per inch; a Hills, Inc-style melt blown dies having hole diameters of 0.010 & 0.025 inches, a setback of 0.08 inches and an air gap of 0.60 inches was outfitted at the end of the extruder and had a working width of 500 mm. A temperature profile in the extruder zones of 200/215/235/250° C. & gear pump (3.1 kg/h) with pipe connector & die at regulated at 250° C. The measured filter pack pressure was typically 40 bars (Ext A), and 60 bars (Ext B), with melt temperature of 240° C. Air used to impinge the extrudate was held at 210° C. at 0.7 bar pressure with a constand die-to-collector distance of 80 mm and collection line (drum) speed varying from 7 to 28 meters per minute to vary the basis weight of material.

Process conditions were adjusted to produce samples of varied basis weight measured in grams per square meter (gsm) and fiber diameter measured in micrometers (μm) as shown in the following table. Basis weight from 7 to 65 grams per square meter were obtained with and average fiber diameters measured between 0,9 to 1,1 microns by scanning electron microscopy.

What is claimed is:

1. A fluoropolymer composition comprising a fluoropolymer, wherein said fluoropolymer is a homopolymer of vinylidene fluoride or a copolymer having a random homogeneous distribution of monomers and at least 70 weight percent of vinylidene fluoride monomer units; and wherein said fluoropolymer has a melt viscosity of 0.01 to 0.4 kP, at 100 s$^{-1}$ and 232° C., as measured by parallel plate rheology, and has a weight average molecular weight of from 15,000 to 140,000 Dalton as measured by GPC relative to polymethyl methacrylate (PMMA) narrow standards.

2. The fluoropolymer composition of claim 1, wherein said copolymer further comprises fluoromonomer(s) are selected from the group consisting of tetrafluorethylene (TFE), trifluoroethylene (TrFE), chlorotrifluoroethylene (CTFE), dichlorodifluoroethylene, hexafluoropropene (HFP), vinyl fluoride (VF), hexafluoroisobutylene (HFIB), perfluorobytylethylene (PFBE), pentafluoropropene, 3,3,-trifluoro-1-propene, 2-trifluoromethyl-3,3,3-trifluoropropene, fluorinated vinyl ethers including perfluoropropylvinyl ether (PPVE), perfluorobutylvinyl ether (PBVE), longer chain perflurinated vinyl ethers, fluorinated dioxoles, partially- or per-fluorinated alpha olefins of $C_4$ and higher, partially- or per-fluorinated cyclic alkenes of $C_3$ and higher, and combinations thereof.

3. The fluoropolymer composition of claim 2, wherein said fluoropolymer hexafluoropropene monomer units.

4. The fluoropolymer composition of claim 1, comprising said fluoropolymer and further comprising-one or more additives selected from the group consisting of plasticizers, inorganic fillers, colorants, dyes, antioxidants, compatible non-fluoropolymers, (meth)acrylate homopolymers and copolymers, and solvents.

5. An article comprising the fluoropolymer composition of claim 1.

6. The article of claim 5, wherein said article comprises 2 or more fibers having a number average diameter of less than 9.0 microns.

7. The article of claim 6, wherein said article comprises 2 or more fibers having a number average diameter of from 50 t 5,000 nanometers.

8. The article of claim 6, wherein said fibers have a number average diameter of from 500 to 2000 mu.

9. The article of claim 6, wherein said fibers are formed by a melt-blowing process.

10. The article of claim 6, wherein said article is a non-woven material comprising fluoropolymer fibers having a number average diameter of from 500-2,000 nm.

11. The article of claim 10, wherein said non-woven material is a composite non-woven material, containing at least 1 weight percent of said fluoropolymer fibers having a number average diameter of from 500 to 2000 nm.

12. The article of claim 10, wherein said non-woven article is a composite non-woven comprising said fluoropolymer fibers having a number average diameter of from 500 to 2000 nm, and further comprising one or more fibers selected from fluoropolymers having a diameter greater than 2.0 micron, and the fibers of any diameter selected from the group consisting of polyesters, polyolefins, poly(meth)acrylates, glass fibers, carbon fibers, celluloses, polyaramids, polysulfones, polyamides, polyimides, polyethers, polyether ketones, polycarbonates, polyether polylactic acids, polystyrenics, thereoplastic starch and carbon nanotubes.

13. The article of claim 10, wherein said fluoropolymer fibers have been internally cross-linked after being formed into said article.

14. A process for forming the article of claim 5, wherein said article is subjected to one or more of the following process either during formation of the article, or following the formation of the article:
- a. calendaring, bonding, needle-punching, entanglement, stretching, pleating, electrical charging;
- b. chemical, electromagnetic radiation, plasma, or thermal treatment;
- c. cutting, grinding or chopping into shorter pieces;
- d. pleating, stretching, or compression;
- e. coloring or dying.

15. The article of claim 5, wherein said article is an injection-molded part.

16. The article of claim 5, wherein said article is bonded to a substrate.

17. The article of claim 16, wherein said substrate comprises cellulose, glass fiber, metal fiber or wire, or non-fluorinated thermoplastic fibers.

* * * * *